(12) United States Patent
Hawk, Jr. et al.

(10) Patent No.: US 8,370,777 B2
(45) Date of Patent: Feb. 5, 2013

(54) METHOD OF GENERATING A LEADFRAME IC PACKAGE MODEL, A LEADFRAME MODELER AND AN IC DESIGN SYSTEM

(75) Inventors: Donald E. Hawk, Jr., King of Prussia, PA (US); Stephen M. King, Hamburg, PA (US); Jeffrey M. Klemovage, Breinigsville, PA (US); John J. Krantz, Northampton, PA (US); Allen S. Lim, Milpitas, CA (US); Ashley Rebelo, Allentown, PA (US); Richard J. Sergi, Bethlehem, PA (US)

(73) Assignee: LSI Corporation, Milpitas, CA (US)

( * ) Notice: Subject to any disclaimer, the term of this patent is extended or adjusted under 35 U.S.C. 154(b) by 460 days.

(21) Appl. No.: 12/485,238

(22) Filed: Jun. 16, 2009

(65) Prior Publication Data
US 2010/0318340 A1 Dec. 16, 2010

(51) Int. Cl.
*G06F 9/455* (2006.01)
*G06F 17/50* (2006.01)

(52) U.S. Cl. ........ 716/106; 716/102; 716/103; 716/115; 716/137; 716/139; 257/666; 257/673; 438/123; 361/723

(58) Field of Classification Search .................. 716/106, 716/111–115, 132–135, 102, 103, 108, 137, 716/139; 257/666–677; 438/123; 361/723
See application file for complete search history.

(56) References Cited

U.S. PATENT DOCUMENTS

| 7,075,172 | B2 | 7/2006 | Cigada et al. | |
|---|---|---|---|---|
| 7,631,795 | B2* | 12/2009 | Kim et al. | 228/4.5 |
| 7,904,864 | B2* | 3/2011 | Huynh et al. | 716/122 |
| 2008/0195990 | A1* | 8/2008 | Lamson et al. | 716/8 |
| 2009/0193370 | A1* | 7/2009 | Bantas et al. | 716/4 |

OTHER PUBLICATIONS

"Cadence 3D Design Viewer", by Cadence Design System, @2006.*
"EDA Trend for Package Design", by David Lin, Steve Iowder, and Guy Remer, Amkor Technology, @Sep. 2005.*
Allegro 16.3—What's New; Brad Griffin, Allegro Product Marketing; Cadence Design Systems, Inc.; 15 pages; Dec. 1, 2009.
Video Tutorials for LayoutGen and Layout2APD; http://www.artwork.com/package/apd_import/video.htm; Jan. 12, 2010; 4 pages.
CAD Design Software (CDS); http://www.cad-design.com; Jan. 13, 2010; 1 page.
Tagger—Identifies and Numbers Bond Fingers; http://www.artwork.com/package/tagger/index.htm; Jan. 5, 2010; 2 pages.

* cited by examiner

*Primary Examiner* — Nha Nguyen

(57) ABSTRACT

A method of generating a model of a leadframe IC package, a leadframe modeler and an IC design system are disclosed. In one embodiment the method includes: (1) adding connectivity information to a geometric representation of a leadframe, wherein the connectivity information represents electrical connections between the IC die and leads of the leadframe and (2) formatting the leads to represent BGA point of contacts for the IC die.

16 Claims, 2 Drawing Sheets

Figure 1:
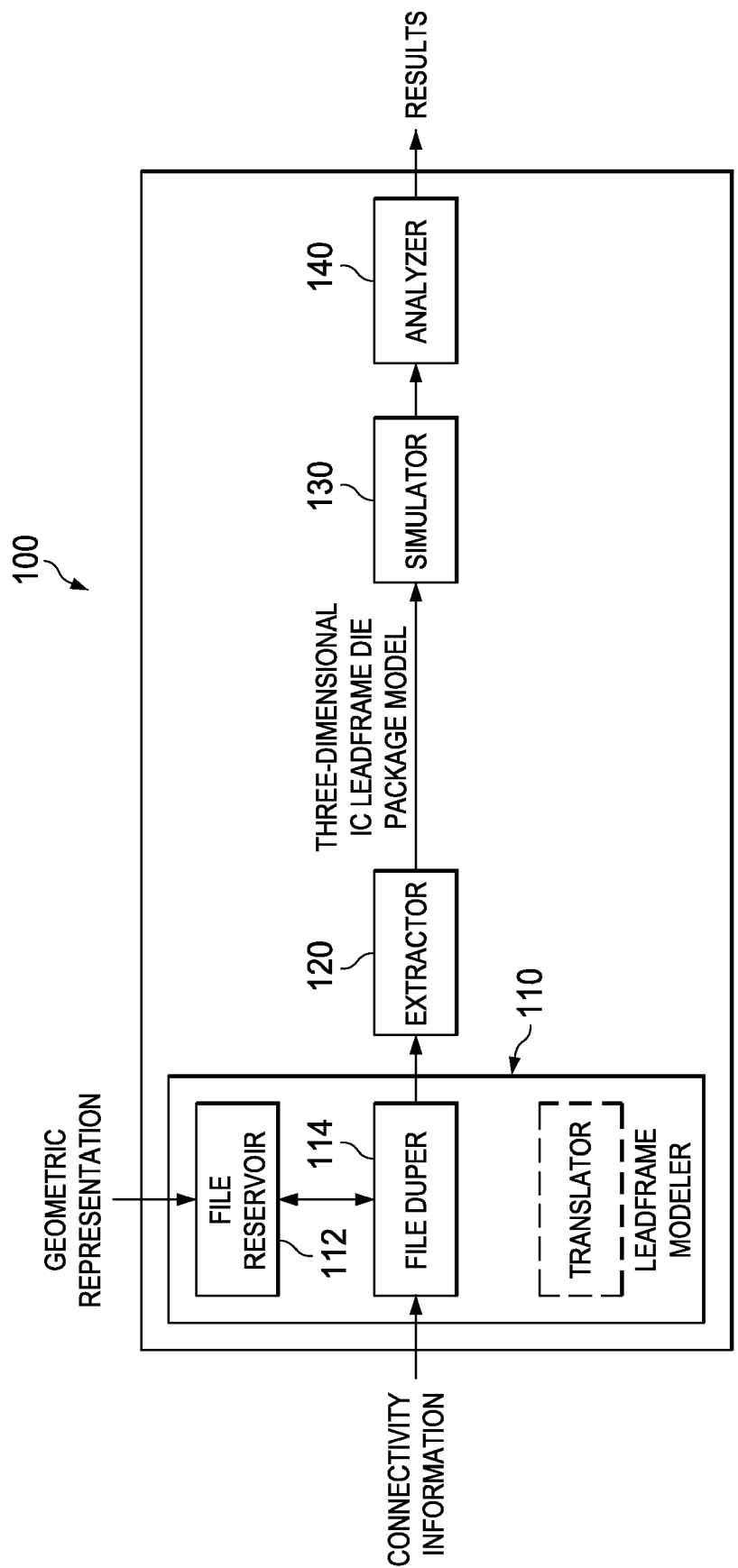

METHOD OF GENERATING A LEADFRAME IC PACKAGE MODEL, A LEADFRAME MODELER AND AN IC DESIGN SYSTEM

TECHNICAL FIELD

This application is directed, in general, to modeling integrated circuits (IC) and, more specifically, to representing leadframe IC packages for IC modeling.

BACKGROUND

Manufacturing of IC packages typically includes verifying an IC design, extracting data from the verified IC design and using the extracted data for simulation and analysis. Commercially available computer tools are used in the IC manufacturing industry to perform these tasks and provide accurate representations of IC packages. The various tools may be used as part of an IC design system.

IC packages typically include at least one die (i.e., a chip) with external connections. The external connections may be, for example, a Ball Grid Array (BGA) or leads of a leadframe. To improve accuracy, the external connections of a particular IC package can be included when simulating. Since the performance of packaging interconnects can dominate the overall performance of IC packages, this can prove beneficial as the demand for improved data rates increases.

SUMMARY

One aspect provides a method of generating a model of a leadframe IC package having leads for electrically connecting an IC die to a substrate. In one embodiment the method includes: (1) adding connectivity information to a geometric representation of a leadframe, wherein the connectivity information represents electrical connections between the IC die and leads of the leadframe and (2) formatting the leads to represent BGA point of contacts for the IC die.

In another aspect a leadframe modeler is disclosed. In one embodiment, the leadframe modeler includes: (1) a file reservoir configured to store a geometric representation of a leadframe for electrically connecting an IC die to a substrate and (2) a file duper configured to provide a leadframe model by adding connectivity information to the geometric representation for electrical connections between the IC die and leads of the leadframe, the leadframe model representing the leads as BGA point of contacts.

In yet another aspect, an IC design system is disclosed. In one embodiment, the IC design system includes: (1) a simulator configured to simulate a three-dimensional leadframe model of an IC die package, (2) a leadframe modeler having: (2A) a file reservoir configured to store a geometric representation of a leadframe for electrically connecting an IC die to a substrate and (2B) a file duper configured to provide a leadframe model by adding connectivity information to the geometric representation for electrical connections between the IC die and leads of the leadframe, the leadframe model representing the leads as BGA point of contact, and (3) an extractor configured to convert the leadframe model from a two-dimensional model to the three-dimensional leadframe model.

BRIEF DESCRIPTION

Figure 2:
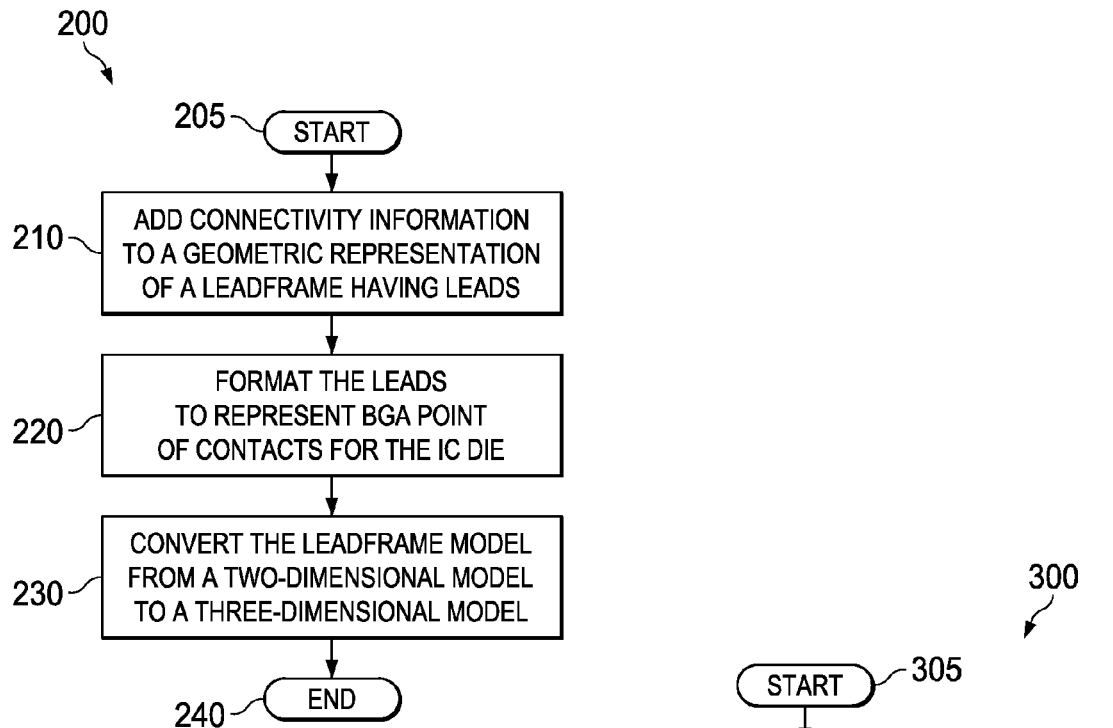
Figure 3:
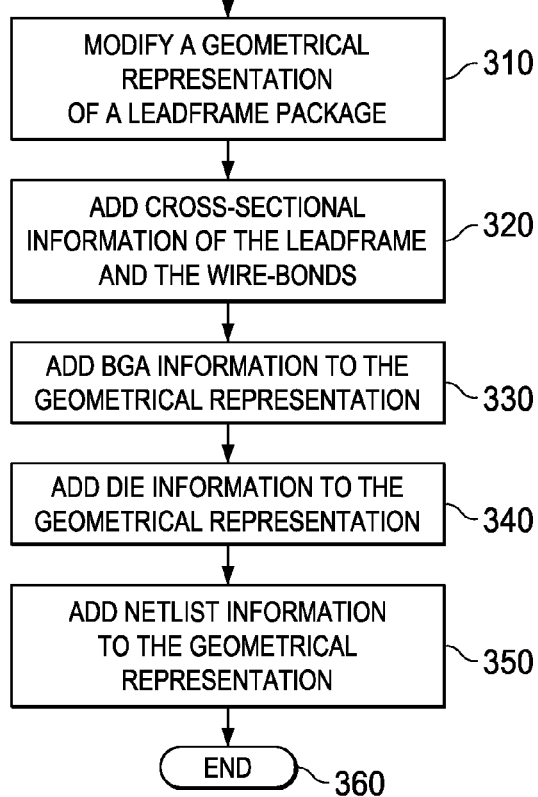

Reference is now made to the following descriptions taken in conjunction with the accompanying drawings, in which:

FIG. 1 is an illustration of a block diagram of an embodiment of an IC design system including a leadframe modeler constructed according to the principles of the present invention;

FIG. 2 is an illustration of a flow diagram of an embodiment of a method for generating a model of a leadframe IC package carried out according to the principles of the present invention; and FIG. 3 is an illustration of a flow diagram of an embodiment of a method employing a conventional tool to add connectivity information to a geometrical representation of a leadframe carried out according to the principles of the present invention.

DETAILED DESCRIPTION

Electrical extraction tools are used to create an electrical model of an IC design that is suitable for simulation. Commercially available extraction tools, for example, may generate the electrical models in SPICE or IBIS formats for simulating. Current electrical extraction tools usually have the capability of extracting BGA packages either in Flip-Chip or Wire-bond form. The extraction tools, however, lack the capability of extracting the external connections, or leads, of IC leadframe packages (i.e., leadframe packages). This may be due to, for example, the lack of non-standardized leadframe drawings. Accordingly, the disclosure will show a method for creating drawings that can be used by commercially available tools to extract data associated with the leads of a leadframe package to include in simulations. As such, the accuracy of simulating a leadframe package employing leads as external connections, such as for signal integrity modeling simulation, can be improved.

A leadframe package includes at least one die bonded to a leadframe. One skilled in the art will understand that a leadframe package may include multiple dies. However, for simplicity, a single die will be discussed in different portions of the disclosure. The die includes a plurality of pads formed thereon as input/output ports for a variety of signals. The leadframe includes a die paddle to which the die is attached and a plurality of leads with contact points which are electrically connected to the pads to receive or transmit a variety of signals from or to an external circuit. Typically, bonding wires are used to electrically connect each pad to a respective contact point on the leads. A mold, typically a resin mold, can be placed over the die and a portion of the leadframe during an encapsulation process. In some embodiments of leadframe packages, lead tips or lead extensions are external to the mold and provide contact points for the external circuits.

The drawings generated for the leadframe package can be standardized drawings which will be used as inputs to electrical extraction tools that are commercially available. The standardized drawings can be formatted as conventional BGA files that are integral in creating three-dimensional structures for electrical extraction. The standardized drawings include the connectivity information between the IC dies and the leads of an IC leadframe package. As such, the disclosure provides an embodiment that represents leadframe packages as a BGA die package that can be used as an input for a conventional extraction tool. In a BGA die package, the die uses a BGA for external connections instead of the leads.

FIG. 1 is an illustration of a block diagram of an embodiment of an IC design system 100 constructed according to the principles of the present invention. The IC design system 100 may be a dedicated computing device. In one embodiment, at least part of the IC design system 100 may be embodied as a plurality of instructions on a computer-readable storage medium that, when executed by a processor, cause the processor to create a leadframe model, simulate the leadframe model and analyze the simulation. The IC design system 100 includes a leadframe modeler 110, an extractor 120, a simulator 130 and an analyzer 140. The leadframe modeler 110 includes a file reservoir 112 and a file duper 114. As noted below, in some embodiments, the leadframe modeler 110 may include a translator.

The file reservoir 112 is configured to store a geometric representation of a leadframe for electrically connecting an IC die to a substrate. The geometric representation is a two-dimensional drawing of a leadframe and is provided in electronic form. The geometric representation may be based on a leadframe drawing generated by a Computer-Aided Design (CAD) tool. MicroStation from Bentley Systems, Incorporated of Exton Pennsylvania, AutoCAD from Autodesk, Inc., of San Rafael, California, or another comparable CAD tool capable of providing two-dimensional drawings may be used to generate or modify the geometric representation. The geometric representation may be stored in a designated format used for inputs of the file duper 114.

The file duper 114 is configured to provide a leadframe model by adding connectivity information to the geometric representation for electrical connections between an IC die and leads of the leadframe. The connectivity information may be created and received from an IC design tool during the design process. In some embodiments, the connectivity information may be received from an external source. In some embodiments, at least some of the connectivity information may be provided from the file reservoir 112. The file duper 114 is configured to create the leadframe model to represent the leads as BGA point of contacts. The connectivity information added by the file duper 114 may include IC die data from a single die or from multiple dies, lead data, net-list data and component data including passive component data such as capacitors and resistors. In one embodiment, the file duper 114 may add unique lead identifiers to indicate where to bond wires between the die and the leads. The file duper 114 may also add connectivity information by assigning bond finger numbers for each of the external connections and by propagating a net-list through files associated with the IC die and the leadframe model. For example, the file duper 114 may propagate the net-list through a wire-bond file and a BGA file that are associated with the IC die. Cross-section information of the leadframe may also be added to the geometric representation to provide the leadframe model.

The file duper 114 may include multiple functions that are used to add the connectivity information to the geometrical representation. The file duper 114 may be configured to allow a user to employ the functions thereof to direct the addition of the connectivity information. The file duper 114 may be implemented employing a commercially available IC package design tool. For example, in one embodiment, the file duper 114 may employ a commercially available package design tool, such as, the Advance Package Designer (APD) tool distributed by Cadence Design Systems, Inc. (Cadence), of San Jose, Calif. In other embodiments, the file duper 114 may employ other electronic design automation (EDA) tools.

The extractor 120, the simulator 130 and the analyzer 140 may be conventional tools used to create models to simulate IC designs and analyze the simulation, respectively. The extractor 120 may be configured to create the models in a designated format for simulation. As noted, the extractor 120 may be a conventional extraction tool, such as an extraction tool from Apache Design Solutions of San Jose, Calif., or Synopsys of Mountain View, Calif.

In one embodiment, the extractor 120 includes a translator that is configured to convert the leadframe model from a two-dimensional model to a three-dimensional model. The translator may be a conventional tool that is typically used for converting a two-dimensional BGA package to a three-dimensional model that can be used as an input for a commercially available extraction tool, such as the extractor 120. In some embodiments, a translator may be part of the leadframe modeler 110 or even a stand-alone component of a design system. As such, the file duper 114 may be configured to put the leadframe model in the format of a two-dimensional BGA package model that can be used by a translator of an extraction tool, the leadframe modeler 110 itself or an independent translator. In some embodiments, the two-dimensional or the three dimensional leadframe model may be stored in the file duper 114 to provide intelligent standardized drawings for future use. The intelligent standardized drawings can be used to provide information for signal integrity testing (i.e., signal integrity models).

The simulator 130 may be configured to perform an electromagnetic simulation of the three-dimensional leadframe model. In one embodiment, the simulator 130 may be a SPICE simulator. The simulator 130 and the analyzer 140 may be distributed by a single manufacturer and configured to operate with the extractor 120. In one embodiment, the simulator 130 and the analyzer 140 may be IC design tools distributed by Cadence.

FIG. 2 is an illustration of a flow diagram of an embodiment of a method 200 for generating a model of a leadframe IC package carried out according to the principles of the present invention. The method 200 may be performed by a computer. In one embodiment a dedicated computing device may be designed to perform the method 200. For example, in one embodiment a leadframe modeler, such as the leadframe modeler 110 of FIG. 1, may be constructed with the necessary circuitry to perform at least some of the steps of the method 200. The method 200 begins in a step 205.

In a step 210, connectivity information is added to a geometric representation of a leadframe. The connectivity information represents electrical connections between the IC die and leads of the leadframe. The geometric representation is based on a leadframe drawing from, for example, a CAD tool. The geometric representation may be received when beginning the method 200. Alternatively, the geometric representation may already be stored in, for example, a file reservoir as described in FIG. 1. In some embodiments, the geometric representation may be modified to place it in a specific format before further adding the connectivity information. A CAD tool may be used to perform the modifications. Alternatively, the geometric representation may already be in condition, e.g., the proper format, for the addition of data.

A user may direct the addition of the connectivity information to the geometric representation. In one embodiment, a user may employ the functions of a file duper to direct the addition of the connectivity information. At least a portion of the file duper may be a commercially available package design tool. FIG. 3 represents an embodiment of adding the connectivity information employing a specific package design tool.

After adding the connectivity information, the leads are formatted to represent BGA point of contacts for the IC die in a step 220. The formatting includes formatting the leads as a BGA input file for a translator.

The leadframe model is then converted from a two-dimensional model to a three-dimensional model in a step 230. A commercially available extraction tool with a translator may be employed. The three-dimensional model is a leadframe package model that can be provided to a commercially available simulator. Simulation and analysis of the leadframe package can then be performed. The method 200 ends in a step 240.

FIG. 3 illustrates a flow diagram of an embodiment of a method 300 employing a conventional tool to add connectivity information to a geometrical representation of a leadframe carried out according to the principles of the present invention. In FIG. 3, the conventional tool is the APD from Cadence. In other embodiments, other design tools may be used, such as, a Unified Package Designer from Sigrity of Santa Clara, Calif. The method 300 begins in a step 305.

In a step 310, a geometrical representation of a leadframe package is modified. The geometrical representation may be modified by removing extra lines and more clearly defining shapes. Shapes can be created using the "COMPOSE SHAPE" function of the APD. A paddle for receiving the die can also be created using "COMPOSE SHAPE." If a shape of the geometric representation will not compose, line segments may be aligned or extra lines may be removed to assist in defining a shape.

Before being received by the APD, the geometrical representation of the leadframe may have already been modified and placed in a format for the APD. For example, the geometrical representation may have been saved in a drawing interchange (or exchange) (DXF) format.

Modification of the geometrical representation before being received by the APD may begin with a typical leadframe, two-dimensional drawing as illustrated and performed by a MicroStation, AutoCAD or another CAD tool. Wire bond information may be added to the leadframe drawing to determine parts of the leadframe that will not be needed. As such, the wires may only be used as references. To accomplish this, a "Wire Bond File" may be read into the CAD tool. One layer may be used for the leadframe and another layer may be used for the wires. All lines and text that are not needed to represent the leadframe may be removed. Simple shapes for each lead, power bar and paddle associated with the leadframe may be created. Additionally, bond finger guides for lead tips, power bars and paddle may be added. In some embodiments, a shape for the mold cap may be applied to verify that each lead of the leadframe terminates on the outside of the body (i.e., the mold cap).

Returning now to the APD, cross-section information of the leadframe and the wirebonds is added in a step 320. The cross-section information may include the type of surface, the material used, the thickness, the conductivity and the dielectric constant. The "Layout Cross Section" screen of the APD may be used to add the information.

BGA information is then added to the geometrical representation in a step 330. "BGA Text In" may be used to add and edit the information. The BGA information can by dynamically created to match the leadframe. In some embodiments, lead extensions of the leadframe are defined. When the DXF file of the geometric representation is imported, the location of the lead extensions may be unknown with respect to the mold cap. As such, the lead extensions can be defined to extend beyond the mold cap boundary. Additionally, lead BGA pad-stacks may be selected to represent solder-mask openings of a printed circuit board (PCB) wherein the leadframe package will be mounted. The paddle of the BGA may be represented by a periphery array of square pads.

Die information may then be added in a step 340. The die information may be added using the "Die Text In" to read in die text. Net-list information including wire-bond information is then added in a step 350. The wire-bonds can be grouped together based on three-dimensional profiles thereof. The "Derive Assignment" function of APD can be used to propagate the net-list to all of the connected metal of the leadframe package including the wire-bond, the leadframe and the BGA. Isolated power and/or ground leads of the leadframe may be named sequentially (e.g., VDD18_1, VDD18_2, . . . VDD18_190 ).

The wire-bond information may be added by assigning bond finger numbers. In a BGA package, the fingers are located in a trace. With a leadframe package, the fingers are the leads of the leadframe. When assigning bond finger numbers, a beginning and a termination of the wire-bonds are defined between the die and the leads. By assigning the bond fingers, a net-list of these connections is also created.

To assign bond finger numbers, a subclass may be created for bond finger numbers in "Substrate Geometry" of the APD and existing bond finger labels can be removed. For example, using the APD, "Bond Finger Text" and run "remove existing finger label" functions may be used. Bond finger numbers can then be assigned using the "Bond Finger Text" function. The "Display Pin Text" function of the APD may be used to display the bond finger text in the geometry subclass that was created. In some embodiments, multiple wire-bonds may be assigned to the same lead finger. The "Property Edit" function in the APD may be used to achieve this multiple assigning.

The method 300 then ends in a step 360. By employing the method 300 a model of a leadframe package can be created in a format that is acceptable as an input for a commercially available extraction tool. A converter or translator may be used with the extraction tool to convert the model from two-dimensions to three-dimensions to provide the desired format for a conventional simulator.

The above-described apparatus and methods may be embodied in or performed by various conventional digital data processors or computers, wherein the computers are programmed or store executable programs of sequences of software instructions to perform one or more of the steps of the methods, e.g., steps of the method of FIGS. 2-3. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIGS. 2-3. Additionally, an apparatus, such as a leadframe modeler, may be designed to include the necessary circuitry to perform each step of the method of FIG. 2.

Those skilled in the art to which this application relates will appreciate that other and further additions, deletions, substitutions and modifications may be made to the described embodiments. For example, instead of BGA point of contacts, leads may be formatted as another component that is accepted by commercially available extraction tools.

What is claimed is:

1. A method of generating a model of a leadframe integrated circuit package having leads for electrically connecting an integrated circuit die to a substrate, comprising:
    adding connectivity information to a geometric representation of a leadframe to provide a leadframe model, said adding includes propagating a net-list through a wire-bond file of said integrated circuit die, a ball grid array (BGA) file associated with said integrated circuit die and said leadframe model, wherein said connectivity information represents electrical connections between said integrated circuit die and leads of said leadframe; and formatting, by using a computer, said leads of said leadframe as ball grid array points of contact for said integrated circuit die, including formatting said leads as a BGA input file to simulate said leadframe with a simulator tool.

2. The method as recited in claim 1 further comprising converting said leadframe model from a two-dimensional model to a three-dimensional model.

3. The method as recited in claim 1 wherein said geometric representation is based on a two-dimensional leadframe drawing from a computer aided design tool.

4. The method as recited in claim 1 wherein said connectivity information includes data selected from the group consisting of:
   integrated circuit die data,
   net-list data,
   lead data, and
   component data.

5. The method as recited in claim 1 wherein said adding said connectivity information includes defining a relationship of a mold cap of said integrated circuit die to lead extensions of said geometric representation.

6. The method as recited in claim 1 wherein said adding said connectivity information includes assigning bond finger numbers for each of said leads.

7. The method as recited in claim 1 wherein said adding said connectivity information includes adding cross-section information of said leads to said leadframe model.

8. A non-transitory computer readable medium embodying a leadframe modeler as a series of operating instructions configured to direct the operation of a processor, when executed, to perform steps, comprising:
   storing a geometric representation of a leadframe for electrically connecting an integrated circuit die to a substrate; and
   providing a leadframe model by adding connectivity information to said geometric representation for electrical connections between said integrated circuit die and leads of said leadframe and formatting said leadframe model as a ball grid array (BGA) input file to simulate the leadframe with a simulator tool, wherein said adding connectivity information includes propagating a net-list through a wire-bond file of said integrated circuit die, a BGA file associated with said integrated circuit die and said leadframe model, said leadframe model representing said leads as ball grid array contact points.

9. The non-transitory computer readable medium as recited in claim 8 further comprising converting said leadframe model from a two-dimensional model to a three-dimensional model.

10. The non-transitory computer readable medium as recited in claim 8 wherein said geometric representation is based on a leadframe drawing from a computer aided design tool.

11. The non-transitory computer readable medium as recited in claim 8 wherein said connectivity information includes data selected from the group consisting of:
   integrated circuit die data,
   net-list data,
   lead data, and
   component data.

12. The non-transitory computer readable medium as recited in claim 8 wherein said adding connectivity information includes defining a relationship of a mold cap of said integrated circuit die to lead extensions of said geometric representation.

13. The non-transitory computer readable medium as recited in claim 8 wherein said adding connectivity information includes assigning bond finger numbers for each of said leads.

14. The non-transitory computer readable medium as recited in claim 8 wherein said adding connectivity information includes information by adding cross-section information of said leads to said leadframe model.

15. An integrated circuit design system, comprising:
   a processor;
   a data storage coupled to the processor;
   program code stored within the data storage and executable by the processor to cause the integrated circuit design system to perform:
      adding connectivity information to a geometric representation of a leadframe to provide a leadframe model, said adding includes propagating a net-list through a wire-bond file of said integrated circuit die, a ball grid array (BGA) file associated with said integrated circuit die and said leadframe model, wherein said connectivity information represents electrical connections between said integrated circuit die and leads of said leadframe; and
      formatting said leads to represent BGA points of contact for said integrated circuit die, including formatting said leads as a BGA input file to simulate said leadframe with a simulator; and
   an extractor configured to convert said leadframe model from a two-dimensional model to a three-dimensional-dimensional leadframe model.

16. The integrated circuit design system of claim 15 further comprising an analyzer configured to analyze results generated by said simulator.

* * * * *